United States Patent
Sells et al.

(10) Patent No.: US 7,912,602 B2
(45) Date of Patent: Mar. 22, 2011

(54) VISUAL DIAGNOSTIC SYSTEM AND SUBSCRIPTION SERVICE

(75) Inventors: Scott Matthew Sells, East Peoria, IL (US); James Lester Greene, Bristol, IL (US)

(73) Assignee: Caterpillar Inc., Peoria, IL (US)

( * ) Notice: Subject to any disclaimer, the term of this patent is extended or adjusted under 35 U.S.C. 154(b) by 777 days.

(21) Appl. No.: 11/819,918

(22) Filed: Jun. 29, 2007

(65) Prior Publication Data

US 2009/0005928 A1    Jan. 1, 2009

(51) Int. Cl.
*G01M 17/00* (2006.01)
*G01M 13/00* (2006.01)

(52) U.S. Cl. .................................. 701/33; 701/29
(58) Field of Classification Search .................. 701/33
See application file for complete search history.

(56) References Cited

U.S. PATENT DOCUMENTS

| | | | |
|---|---|---|---|
| 5,216,612 A * | 6/1993 | Cornett et al. | 700/96 |
| 5,463,567 A | 10/1995 | Boen et al. | |
| 6,138,056 A * | 10/2000 | Hardesty et al. | 700/174 |
| 6,430,486 B1 | 8/2002 | Diaz et al. | |
| 6,609,051 B2 * | 8/2003 | Fiechter et al. | 701/33 |
| 6,701,232 B2 * | 3/2004 | Yamaki | 701/33 |
| 6,745,151 B2 * | 6/2004 | Marko et al. | 702/182 |
| 6,810,406 B2 * | 10/2004 | Schlabach et al. | 1/1 |
| 6,959,235 B1 * | 10/2005 | Abdel-Malek et al. | 701/33 |
| 7,023,332 B2 | 4/2006 | Saito et al. | |
| 7,092,974 B2 | 8/2006 | Thomas et al. | |
| 7,209,817 B2 * | 4/2007 | Abdel-Malek et al. | 701/33 |
| 7,219,063 B2 | 5/2007 | Schalk et al. | |
| 7,478,060 B2 * | 1/2009 | Goldsmith et al. | 705/29 |
| 7,499,777 B2 * | 3/2009 | Grichnik et al. | 701/29 |
| 2002/0007225 A1 * | 1/2002 | Costello et al. | 700/99 |
| 2002/0112025 A1 | 8/2002 | Johansson et al. | |
| 2002/0161495 A1 * | 10/2002 | Yamaki | 701/33 |
| 2003/0055812 A1 * | 3/2003 | Williams et al. | 707/1 |
| 2003/0114965 A1 * | 6/2003 | Fiechter et al. | 701/29 |
| 2003/0120472 A1 | 6/2003 | Lind | |
| 2003/0216889 A1 * | 11/2003 | Marko et al. | 702/182 |
| 2005/0102050 A1 * | 5/2005 | Richey | 700/97 |
| 2005/0273229 A1 * | 12/2005 | Steinmeier et al. | 701/29 |
| 2005/0273230 A1 * | 12/2005 | Steinmeier et al. | 701/29 |
| 2006/0230313 A1 * | 10/2006 | Grichnik et al. | 714/26 |
| 2006/0278064 A1 * | 12/2006 | Lourdeaux | 84/609 |
| 2007/0033525 A1 | 2/2007 | Nuno et al. | |
| 2007/0208464 A1 * | 9/2007 | Moorhead | 701/1 |
| 2008/0249658 A1 * | 10/2008 | Walker et al. | 700/236 |

FOREIGN PATENT DOCUMENTS

| | | |
|---|---|---|
| DE | 10307980 A1 * | 9/2004 |
| EP | 1253415 | 10/2002 |
| GB | 2388666 | 11/2003 |
| JP | 06127825 A * | 5/1994 |
| WO | WO 01/82136 A2 | 11/2001 |
| WO | 2006110246 | 10/2006 |

* cited by examiner

*Primary Examiner* — Thomas G Black
*Assistant Examiner* — Shelley Chen
(74) *Attorney, Agent, or Firm* — Finnegan, Henderson, Farabow, Garrett & Dunner LLP

(57) ABSTRACT

A visual diagnostic system is disclosed. The visual diagnostic system has a sensor located onboard a machine to generate a signal indicative of a status of a machine component, and a user interface associated with the machine to receive input from and provide information to a user. The visual diagnostic system also has a controller in communication with the sensor and the user interface. The controller is configured display on the user interface a model containing the machine component in response to the signal.

15 Claims, 8 Drawing Sheets

VISUAL DIAGNOSTIC SYSTEM AND SUBSCRIPTION SERVICE

TECHNICAL FIELD

The present disclosure relates to a diagnostic system for a machine, and more particularly, to a visual diagnostic system provided as a subscription service for use with the machine.

BACKGROUND

Machines such as, for example, passenger vehicles, trains, marine vessels, construction equipment, excavating machines, etc., include many components that are susceptible to wear and breakdown resulting from everyday use. Such machines have been provided with onboard controllers to detect abnormal operating conditions and warn the machine operator or owner of the conditions. For example, the onboard controller may cause a "check engine" light to become illuminated in response to the detected abnormal conditions.

Although alerted to the abnormal conditions, the machine owner is not ordinarily provided with enough information to diagnose and remedy the problem alone, and must take the machine to a service center where the abnormal conditions can be addressed by a service professional. Because an appointment must be made, and the particular service center selected by the machine owner may be unable to immediately acquire the parts needed for repair, addressing such abnormal conditions may result in significant machine downtime, even for a relatively minor issue. In a case where the machine is used in an industry such as, for example, excavation, construction, farming, transportation, etc., such downtime can result in significant economic losses and missed deadlines.

One system that attempts to minimize machine downtime is described in U.S. Pat. No. 7,023,332 (the '332 patent) issued to Saito et al., on Apr. 4, 2006. The '332 patent discloses an on-vehicle breakdown-warning report system, in which an abnormal operating condition is automatically detected. Information about the abnormal operating condition is sent to an off-board server computer where it is analyzed. Based on the analysis, the server computer determines the one or two best service companies that can perform the maintenance that will probably be necessary to repair the vehicle. The service companies are then provided to the vehicle operator for selection.

Although the system of the '332 patent may help reduce down time and resources spent in connection with identifying and locating an appropriate service company, it may be limited. Specifically, the operator must still bring his vehicle to the service company before appropriate replacement parts can be ordered. Therefore, in circumstances where the repair is relatively simple and/or the operator has the knowledge and means to replace the part on his own, the downtime reduced by usage of the system of the '332 patent may be minimal.

The disclosed visual diagnostic subscription service is directed to overcoming one or more of the problems set forth above.

SUMMARY OF THE INVENTION

One aspect of the disclosure is directed to a visual diagnostic system. The visual diagnostic system may include a sensor located onboard a machine to generate a signal indicative of a status of a machine component, and a user interface associated with the machine. The visual diagnostic system may also include a controller in communication with the sensor and the user interface. The controller may be configured to display on the user interface a model containing the machine component in response to the signal.

Another aspect of the disclosure is directed to a method of visually identifying a failed component. The method may include detecting a status of a machine component. The method may also include displaying a model containing the machine component in response to the detected status.

DETAILED DESCRIPTION

Figure 1:
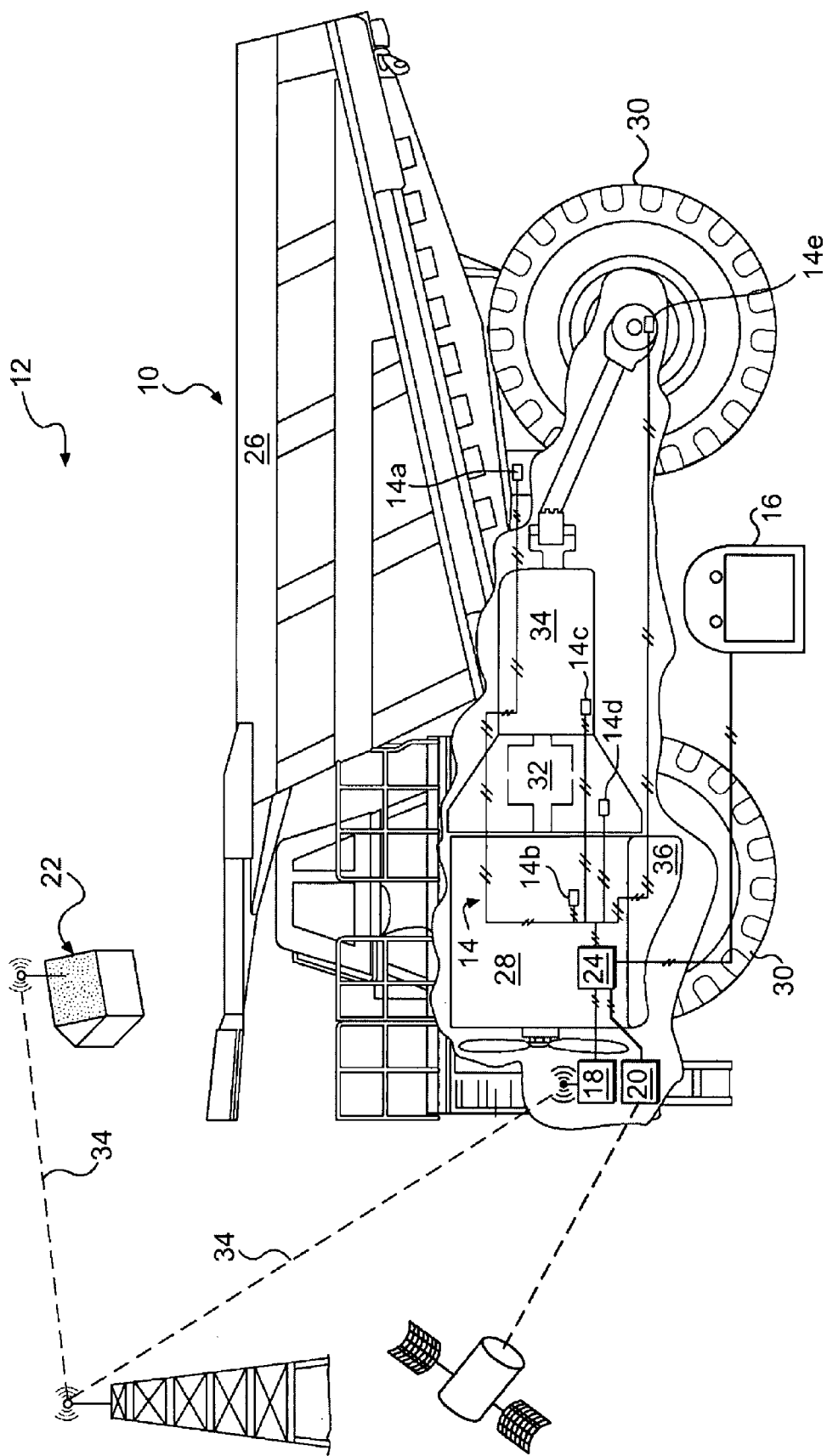
FIG. 1 is a diagrammatic and schematic illustration of an exemplary disclosed machine.

FIG. 1 illustrates an exemplary machine 10 having a visual diagnostic system 12. Machine 10 may embody a stationary or mobile machine configured to perform some type of operation associated with an industry such as mining, construction, farming, transportation, power generation, or any other known industry. For example, machine 10 may embody an excavating machine, an on- or off-road haul truck, a passenger vehicle, or a marine vessel. Machine 10 may alternatively embody a stationary generator set, a pumping mechanism, or other suitable operation-performing machine.

System 12 may include one or more components that cooperate to gather and communicate information relating to the operation of machine 10. For example, system 12 may include an interface module 14, a user interface 16, a communication module 18, a locating device 20, and a controller 24 configured to communicate with an off-board control system 22. It is contemplated that one or more of interface module 14, communication module 18, locating device 20, and controller 24 may be integrated as a single unit, if desired. It is further contemplated that system 12 may include additional or different components than those illustrated in FIG. 1.

Interface module 14 may include a plurality of sensors 14a-e distributed throughout machine 10 and configured to gather data from various components, subsystems, and/or operators of machine 10. Sensors 14a-e may be associated with, for example, a work tool 26, a power source 28, a traction device 30 coupled to power source 28 to propel machine 10, a transmission 34, a torque converter 32, a fluid supply 36, user interface 16, and/or other components and subsystems of machine 10. Sensors 14a-e may monitor pressures, temperatures, volumes, voltages, currents, forces, speeds, and/or other parameters, and generate signals indicative of values of the parameters. Additionally, these signals may also indicate an operational status of sensors 14a-e themselves and/or the components and/or subsystems they monitor. In one aspect, the integrity, strength, and/or nature of the signals received from sensors 14a-e may indicate whether the respective components and/or subsystems are functioning properly. For example, different signal intensity thresholds may indicate a good condition, a moderate condition, a poor condition, a failed condition, etc. These signals may be communicated to controller 24 for subsequent processing and/or analysis in connection with the disclosed visual diagnostic subscription service.

User interface 16 may include a monitor, a touch-screen, a portable hand-held device (e.g., a cellular telephone, a personal digital assistant, etc.), a keypad, a control panel, a keyboard, and/or another input device. User interface 16 may receive input from a user, such as, for example, a machine operator, a mechanic, or a machine owner, and generate corresponding command signals in response to the input. These command signals may be communicated to controller 24 for processing. User interface 16 may also display information to the user in response to signals from controller 24 and/or off-board system 16.

Communication module 18 may include any device configured to facilitate communications between controller 24 and off-board system 22. Communication module 18 may include hardware and/or software that enables communication module 18 to send and/or receive data messages through a wireless communication link 38. The wireless communications may include satellite, cellular, infrared, and any other type of wireless communications that enables controller 24 to wirelessly exchange information with off-board system 22.

Locating device 20 may be configured to determine and communicate a location of machine 10 to controller 24 and/or off-board system 22. For example, locating device 20 could include a Global Positioning System (GPS) receiver configured to receive position signals from one or more GPS satellites, an Inertial Reference Unit (IRU), or any other locating device known in the art.

Figure 2:
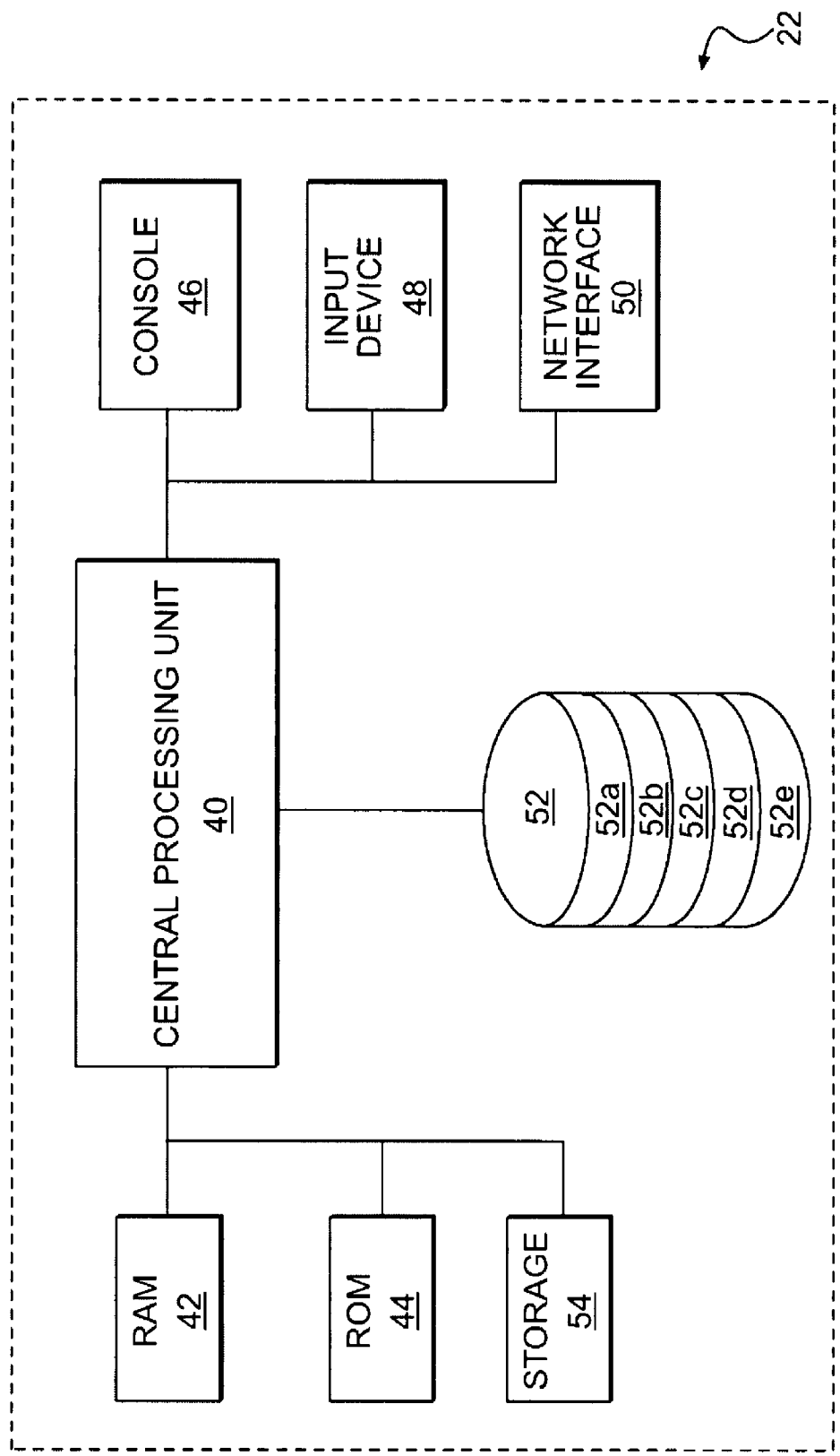
FIG. 2 is a diagrammatic illustration of an off-board control system for use with the machine of FIG. 1.

Off-board system 22 may represent one or more computing systems of a business entity associated with machine 10, such as a manufacturer, dealer, retailer, owner, or any other entity that generates, maintains, sends, and/or receives information associated with the operation of machine 10. The one or more computing systems may include, for example, a laptop computer, a work station, a personal digital assistant, a mainframe, and other computing systems known in the art. As illustrated in the example of FIG. 2, off-board system 22 may include a central processing unit (CPU) 40, a random access memory (RAM) 42, a read-only memory (ROM) 44, a console 46, an input device 48, a network interface 50, a database 52, and a storage 54. It is contemplated that off-board system 22 may include additional, fewer, and/or different components than those listed above. It is to be understood that the type and number of listed devices are exemplary only and not intended to be limiting.

CPU 40 may embody, for example, one or more specially-constructed or generic microprocessors configured execute sequences of computer program instructions to perform various processes in connection with the visual diagnostic subscription service disclosed herein. The computer program instructions may be loaded into RAM 42 for execution by CPU 40 from ROM 44. During operation, CPU 40, and/or controller 24 via communication module 18, may carry out various processes in connection with the visual diagnostic subscription service disclosed herein.

Storage 54 may embody any appropriate type of mass storage provided to store information CPU 40 and/or controller 24 may need to perform the processes. For example, storage 54 may include one or more hard disk devices, optical disk devices, removable memory devices, or other storage devices that provide appropriate storage space.

Off-board system 22 may interface with a user via console 46, input device 48, and network interface 50. In particular, console 46 may display information to users of off-board system 22. Console 46 may be any appropriate type of computer display device or computer monitor. Input device 48 may be provided for users to input information into off-board system 22. Input device 48 may include, for example, a keyboard, a mouse, and/or other wired or wireless computer input devices known in the art.

Network interface 50 may facilitate wireless and/or wired communications such that off-board system 22 may be remotely accessed by controller 24, dealers (not shown), and/or other off-board systems (not shown). Network interface 50 may include and/or be associated with any suitable wired and/or wireless network architecture, such as, for example, a cellular telephone-based network (such as a PBX or POTS), a satellite-based network, a local area network (LAN), a wide area network (WAN), a controller area network (CAN), a dedicated intranet, the Internet, and/or any other suitable network architecture known in the art.

Database 52 may contain, among other things, customer subscription information 52a, a media asset library 52b, diagnostic information 52c, component information 52d, and dealer information 52e. Alternatively or additionally, at least some of the information described as contained in database 52 may be stored on controller 24, if desired.

Customer subscription information 52a may include data about each of a plurality of customers in a customer population (e.g., a customer profile). A customer may be, for example, an owner of one or more machines (e.g., machine 10) that subscribes to the visual diagnostic service described herein. Customer subscription information 52a may include, for each customer, a serial number, a build date, a manufacturer name, and a model for each of the customer's subscribed machines; a name, a shipping/billing addresses, a telephone number, credit card or another account to be charged for services rendered, etc.; a subscription level (e.g., basic, premium, etc.); and a subscription starting date and expiration date; etc. Customer subscription information 52a may also contain shipping preferences for each customer. For example, a customer may wish to have replacement components shipped to the on-site location of the machine, to the billing address, or picked up at the dealer location. Customer subscription information may also contain warranty information about each customer (e.g., expiration date of warranty, type of warranty coverage, etc.).

Media asset library 52b may contain, among other things, a plurality of media assets containing data about a plurality of subscribing machines. For example, the media assets may be CAD data files containing engineering information about one or more components that make up a machine, such as coordinate data defining the geometry and relative position of the components on the machines; and serial numbers, part numbers, manufacturing dates, and version identifiers of the components. In one embodiment, the media assets may be encrypted such that they can only be utilized by the controller of a subscribing machine having appropriate software. Further, the media assets may be stripped of metadata, such as the exact dimensions and specifications of the components, to prevent or make difficult reverse engineering of the machines. In one aspect, the media assets may comprise lightweight CAD data type files, such as JT format files, to facilitate quick transfer, loading, and manipulation thereof. However, it is to be appreciated that the media assets may comprise any data format suitable for storing, manipulating, and transferring engineering data about components of a machine.

In one embodiment, media asset library 52b may contain a media asset (e.g., file) for each type of component of each type of subscribing machine. Each media asset may be hierarchically indexed based on a parts list of the respective machine, such as a bill of materials ("BOM"). For example, each individual media asset of each machine type may be linked to one or more assemblies of media assets. An assembly may include a plurality of media assets corresponding to components that are connected together in some manner to form a larger entity (e.g., bolted, screwed, welded, clipped, glued, interconnected by cables, etc.). Similarly, each assembly of media assets may be indexed to one or more groups of media assets. A group may include a plurality of interrelated assemblies of media assets corresponding to parts that function together for a specific purpose. For example, one group may correspond to all of the assemblies included in the "cab electronics group" or the "implement hydraulic group." Still further, each group of media assets may be indexed to an overall arrangement of media assets, etc., until the overall machine level collection of media assets is reached, which may be collectively identifiable by a machine serial number or the like. It is to be appreciated, however, that other schemes of media asset organization and/or indexing may be used, if desired.

Diagnostic information 52c may include data that can be used to identify a component of a machine that has failed. For example, diagnostic information 52c may include tables of fault codes for each machine type (i.e., manufacturer, model number, etc.) indexed according to machine serial number. The tables may include entries indicating at least one failed component for each fault code. That is, for a particular machine type, each fault code may be linked or indexed to one or more failed components. The links between fault codes and failed component(s) may be established by authorized expert users of off-board system 22. Based on maintenance and repair data (e.g., statistical data), a given fault code may be known to indicate with substantial certainty the failure of a particular component or components. For example, a given fault code for a particular machine may indicate with 90% certainty that a temperature sensor and/or cable has failed. In another example, a given fault code may indicate with 75% certainty that a wiring harness and mounting bracket has detached from its proper location, and with 25% certainty that a wire in the harness has been severed or otherwise damaged. Each fault code may be further associated with information (e.g., name, part number, manufacturer, etc.) about accessories related to the one or more failed components associated with the fault code. For example, the accessories may include glue, nuts, bolts, seals, tools, lubricant, other replaceable parts in the vicinity of and/or functionally related to the one or more failed components, and/or other accessories that may be recommended to facilitate the assembly and/or replacement of the one or more failed components. The expert users of off-board system 22 may keep diagnostic information 52c up-to-date via console 46 based on forthcoming maintenance and repair data provided by a variety of sources.

Component information 52d may include an up-to-date parts list (e.g., a BOM) of all the components of each type of subscribing machine. For example, the parts list for each subscribing machine type may be hierarchically organized, as discussed above, and contain the latest information for each component of the machine, such as, for example, a name, a serial number, a version number, and/or a date of manufacture for the component. Component information 52d may also include warranty information about each component, such as, for example, whether its replacement is covered by a particular type of warranty. Component information 52d may be kept current by, for example, automatic or manual electronic updates and/or by an authorized user of off-board system 22.

Dealer information 52e may include data about one or more dealers able to supply parts for the subscribing machines, such as addresses and inventory information about a plurality of dealers associated with the visual diagnostic subscription service disclosed herein. Dealer information 52e may include, for each associated dealer, a catalog of components, pricing and inventory information (e.g., in/out of stock, backorder, unavailable, etc.). Dealer information 52e may also include delivery capabilities for each associated dealer (e.g., in-store pickup, on-site delivery, shipping to an address, etc.). Still further, dealer information 52 may include a current maintenance schedule or calendar for each of the associated dealers, such as, for example, a listing of available appointments during which the user may schedule maintenance or service to be completed. Dealer information 52e may be kept current by, for example, periodic automatic or manual electronic updates and/or by the dealer or an authorized user of off-board system 22.

Controller 24 may embody, for example, an electronic control module (ECM), or another processor capable of executing, and/or or outputting command signals in response to received and/or stored data to affect, among other things, the data acquisition discussed herein. Controller 24 may include means for accessing, reading, and processing the media assets described above to display interactive three-dimensional models of machine 10 by way of user interface 16. These means may include components such as, for example, a memory, one or more data storage devices, a central processing unit, or any other components that may be used to run an application. For example, controller 24 may have a built-in software engine or player application capable of rendering interactive three-dimensional models from encrypted CAD data format files (e.g., JT files).

Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM. Controller 24 may also include power supply circuitry, signal-conditioning circuitry, solenoid driver circuitry, communication circuitry, and other appropriate circuitry.

Controller 24 may be in communication with interface module 14, with communication module 18, with locating device 20, and with user interface 16 via communication lines. These communications may be facilitated by any suitable combination of wired and/or wireless hardware and carried out using known proprietary and/or non-proprietary links and protocols. For example, the communications may be executed according to protocols based on known industry standards, such as SAE J1587, SAE J1939, RS-232, RP1210, RS-422, RS-485, MODBUS, SAEJ1587, Bluetooth, 802.11b or g, etc.

Controller 24 may include a database (not shown) having, among other things, an indexed parts list of machine 10, such as a bill of materials ("BOM"). The parts list may be a comprehensive and exhaustive listing of all the components of machine 10. For example, the parts list may be organized hierarchically, as discussed above. The parts list may have one or more entries for each individual component of machine 10 containing information about the component. For example, the entries for each component may include a name, serial number, version, dates of previous replacement or maintenance, and/or a date of manufacture thereof. In one aspect, the parts list of machine 10 may be updated by an authorized user or machine operator by way of user interface 16 and/or automatically by controller 24 in response to maintenance and/or component replacement. The database may also include one or more tables of fault codes indexed by each of sensors 14a-e and/or an integrity, intensity, or other signal parameter thresholds and/or ranges of the signals provided thereby. Controller 24 may also have stored therein a machine serial number, such as a vehicle identification number (VIN), or another type of identification code. The machine serial number may be used by controller 24 and/or off-board system 16 in connection with the visual diagnostic system discussed below.

During operation of machine 10, controller 24 may continually receive the signals from sensors 14a-e. In one aspect, controller 24 may analyze the signals to determine a status of the sensors 14a-e and/or the components or subsystems they monitor. For example, controller 24 may compare the integrity of the signals to the integrity thresholds contained in the fault code table(s). If controller 24 retrieves a fault code from the table(s), controller 24 may, in response, initiate the visual diagnostic system and subscription service of the present disclosure.

In response to a fault code, controller 24 may first request access to off-board system 22. Subsequently, controller 24 and/or off-board system 22 may determine if machine 10 has a valid subscription to the visual diagnostic service. For example, controller 24 and/or off-board system 22 may search customer subscription information 52a for a subscription profile associated with the machine serial number contained on controller 24. If such a profile is found, controller 24 and/or off-board system 22 may determine if the subscription is valid (e.g., has not expired, payments are up-to-date, etc.). If the subscription is valid, access may be granted to the visual diagnostic system.

If it is determined that machine 10 has a valid subscription, controller 24 may search diagnostic information 52c for the fault code. If the fault code is found, which, as mentioned above, may mean that at least one component has failed, controller 24 may retrieve from diagnostic information 52c the data about that component. Controller 24 may then access and search media library 52b for media assets associated with and/or linked to the failed component. Controller 24 may then download and store in memory the media assets associated with the failed component. Alternatively or additionally, controller 24 may cause off-board system 22 to stream in real-time the media assets to controller 24.

Figure 3:
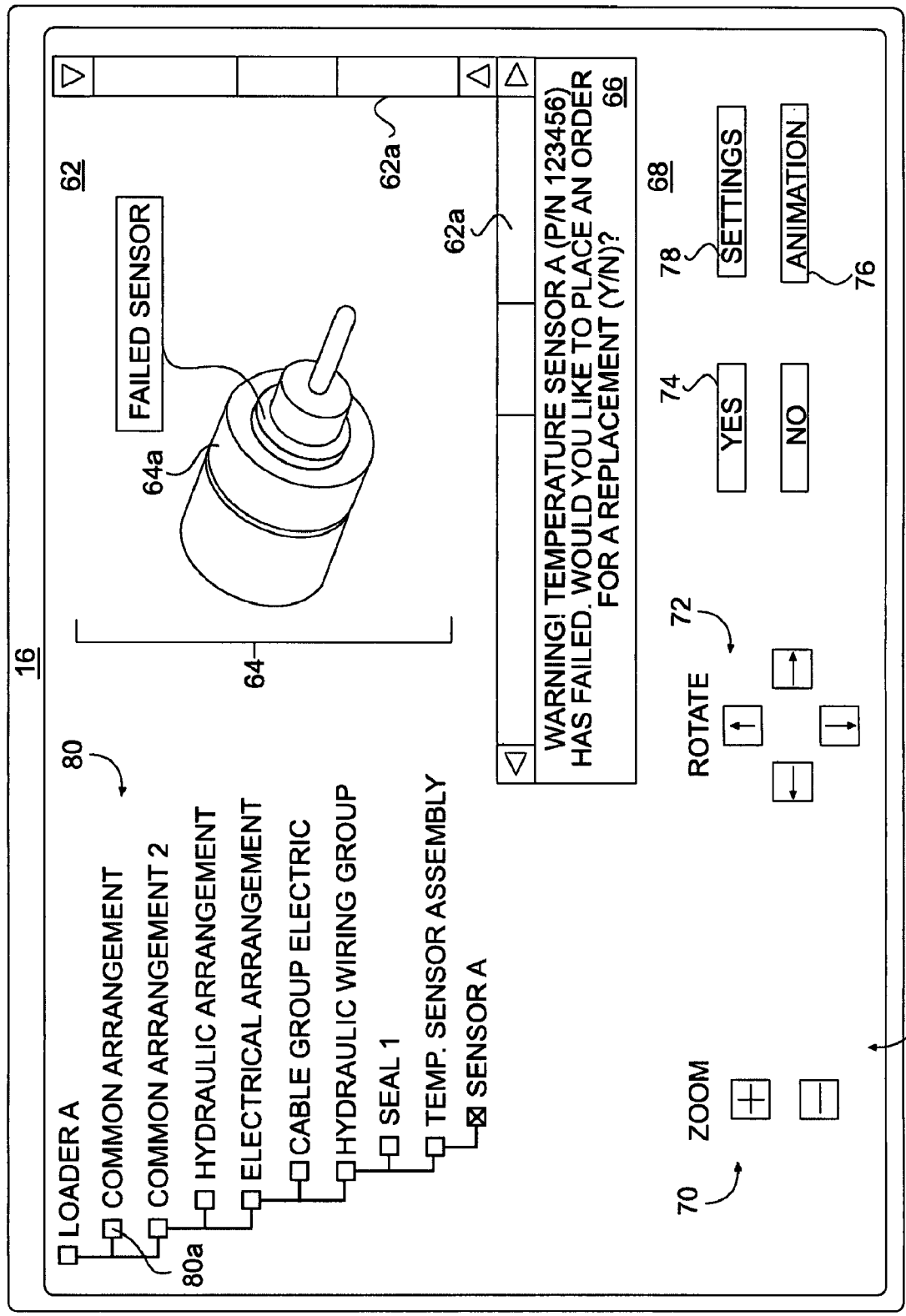
FIGS. 3-8 are a graphical representations of an exemplary disclosed graphical user interface (GUI) for use with the off-board control system of FIG. 2.

Controller 24 may display, on user interface 16, a graphical user interface (GUI) 60, as shown in FIGS. 3-9. Referring to FIG. 3, GUI 60 may be a software tool including menus (e.g., drop-down menus), modules, buttons, toolbars, and other means to facilitate the conveyance and transfer of information to/from a user and off-board system 22 and/or controller 24. It is to be appreciated that GUI 60 may require user authentication, such as, for example, a username, a password, a pin number, an electromagnetic passkey, etc.

GUI 60 may include a display area 62 showing a three-dimensional model of at least one component 64 of machine 10 by itself and/or in its assembled environment. Display area 62 may also include scroll bars 62a allowing the user to scroll the view of at least one component 64 left/right and up/down. Controller 24 may render the three-dimensional models based on the media asset(s) downloaded or streamed in real-time from media asset library 52b. Controller 24 may initially, and by default, display a model of at least one failed component 64a in display area 62. Any components 64 shown in display area 62 may be selectable by the user. Upon the user's selection thereof, controller 24 may display information about the selected component (e.g., name, part number, availability, cost, shipment time, etc.).

Display area 62 may also include an information prompt area 66 in which controller 24 may warn a user of GUI 60 that component 64a has failed, provide information about failed component 64, prompt the user as to whether a replacement should be ordered, and/or provide other information to the user. GUI 60 may also include a controls display area 68 containing zoom buttons 70, rotate buttons 72, "Yes" and "No" buttons 74, an animation button 76, and a settings button 78.

Selection of zoom buttons 70 may cause controller 24 to perform zoom in/zoom out operations on the model of failed component 64a shown in display area 62. Similarly, selection of rotate buttons 72 may cause controller 24 to perform rotation operations on failed component 64a shown in display area 62. As such, the user may be able to customize the displayed view of failed component 64a to better understand the nature of the failure and/or to visually recognize or identify failed component 64a. The user may select Yes/No buttons 74 in response to questions displayed in information prompt area 66 or elsewhere on GUI 60 (e.g., "Would you like to place an order for a replacement part (Y/N)?). Selection of animation button 76 may cause controller 24 to display, for example, an animation of the basic assembly and disassembly of the pertinent systems and subsystems of machine 10 required to access and replace failed component 64a. Selection of settings button 76 may allow the user to change certain preferences associated with the disclosed visual diagnostic system. For example, the user may be able to enter and/or update information contained in customer subscription information 52a. In one aspect, the user may be able to renew a subscription, update a shipping or billing address, update delivery preferences (e.g., on-site or to another shipping address), add an account (e.g., credit card) to be charged for services rendered in connected with the visual diagnostic system, update the BOM for machine 10 following maintenance and/or replacement of a component, change display preferences (e.g., component level displayed upon failure), and/or set other desired preferences.

Controls display area 68 may also include a selectable parts list 80 that shows, hierarchically, where failed component 64a falls within the overall configuration of assemblies and sub-assemblies of machine 10 (e.g., an expanding/collapsing outline). For example, failed component 64a may be Temperature Sensor A, which may fall under the Temperature Sensor Assembly, which may fall under the Wiring Hydraulic Group, which may fall under the Electrical Arrangement, which may fall under Common Arrangement 2 of the overall machine 10 (e.g., Loader A). As such, parts list 80 may include an entry for each collection of components. Upon detecting the failure of a component, controller 24 may highlight or otherwise visually indicate each entry in parts list 80, under which failed component 64a falls.

Each entry in parts list 80 may be selectable by the user. For example, each entry in parts list 80 may contain a box 80a that may be checked and unchecked in response to the user's selection. Controller 24 may display the one or more components of machine 10 corresponding to the checked entries of parts list (i.e., checked assemblies, sub-assemblies, or individual components). For example, in FIG. 3 only the entry for Temperature Sensor A is checked. As such, a three-dimensional model of only a temperature sensor may be shown in display area 62. This may be set as a default display preference in response to detecting a failure of a component.

Figure 4:
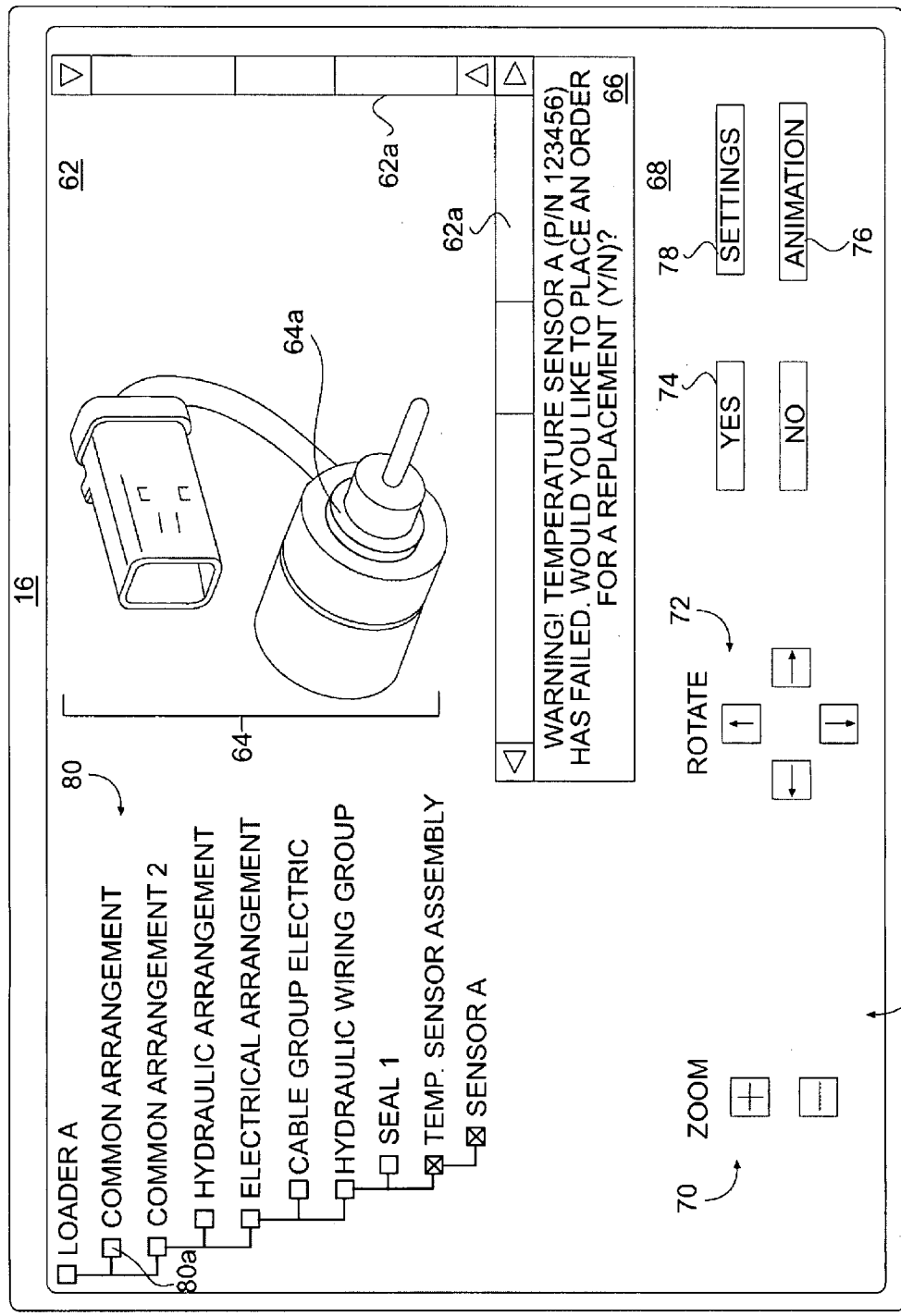
Figure 5:
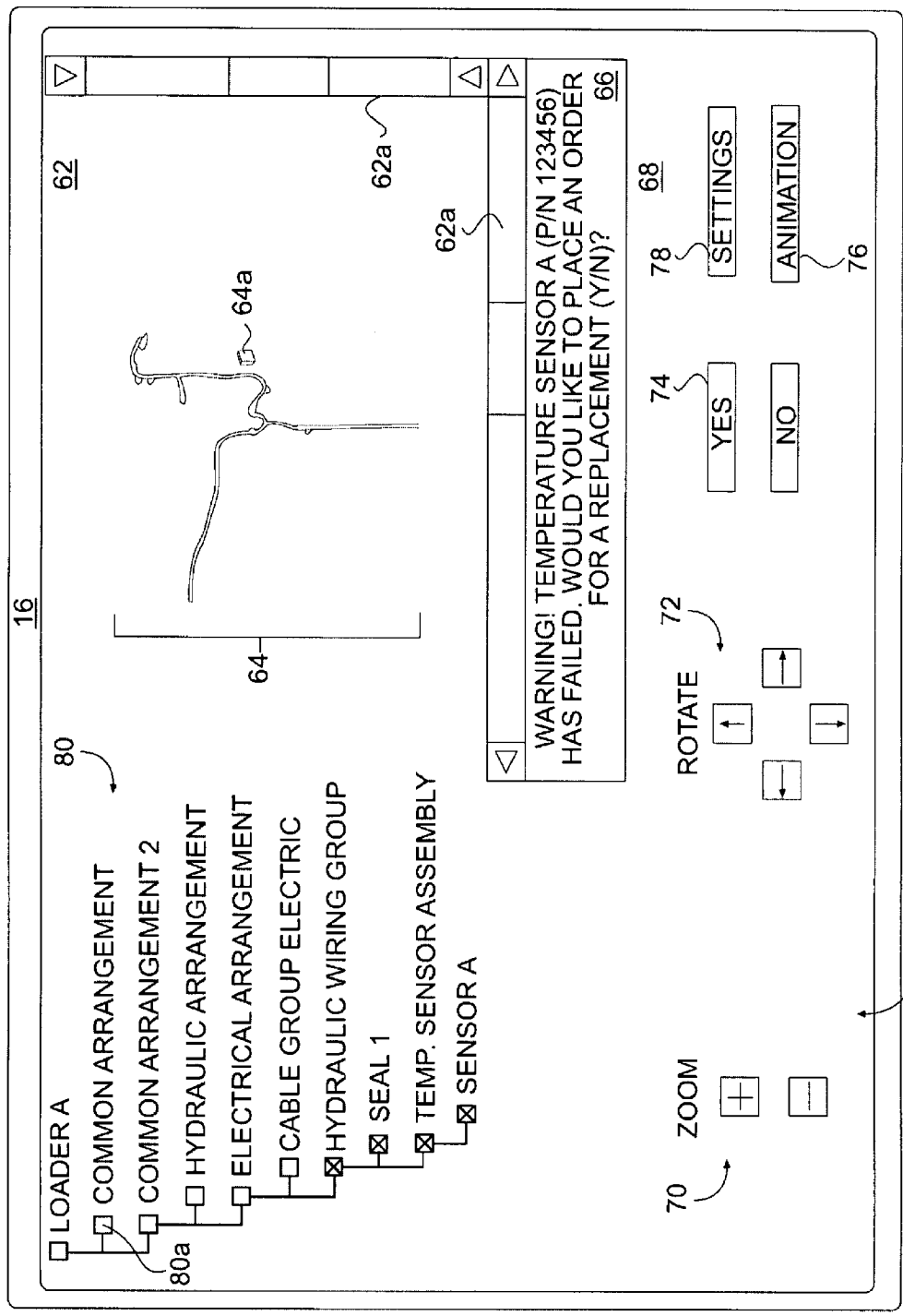
Figure 6:
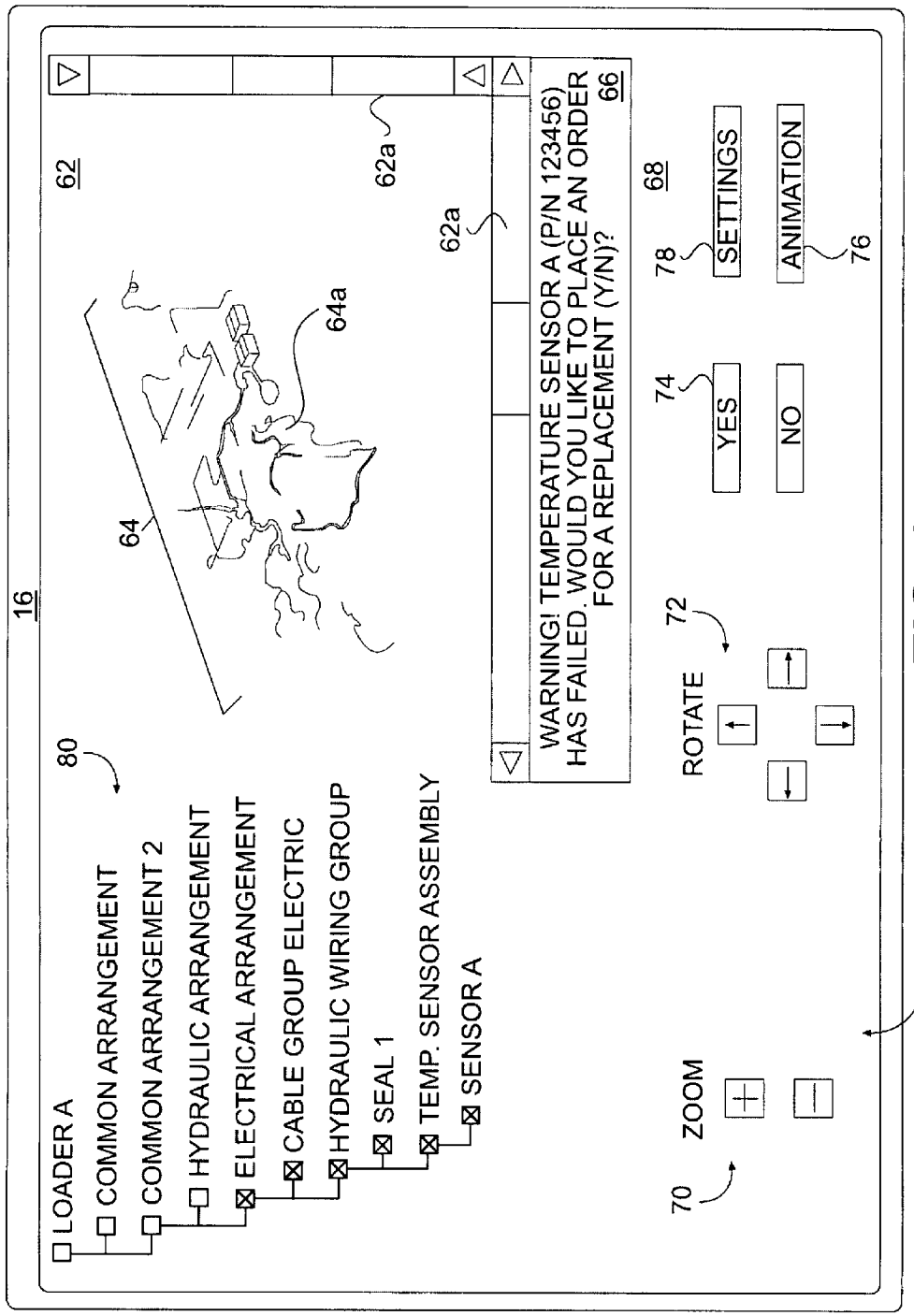
Figure 7:
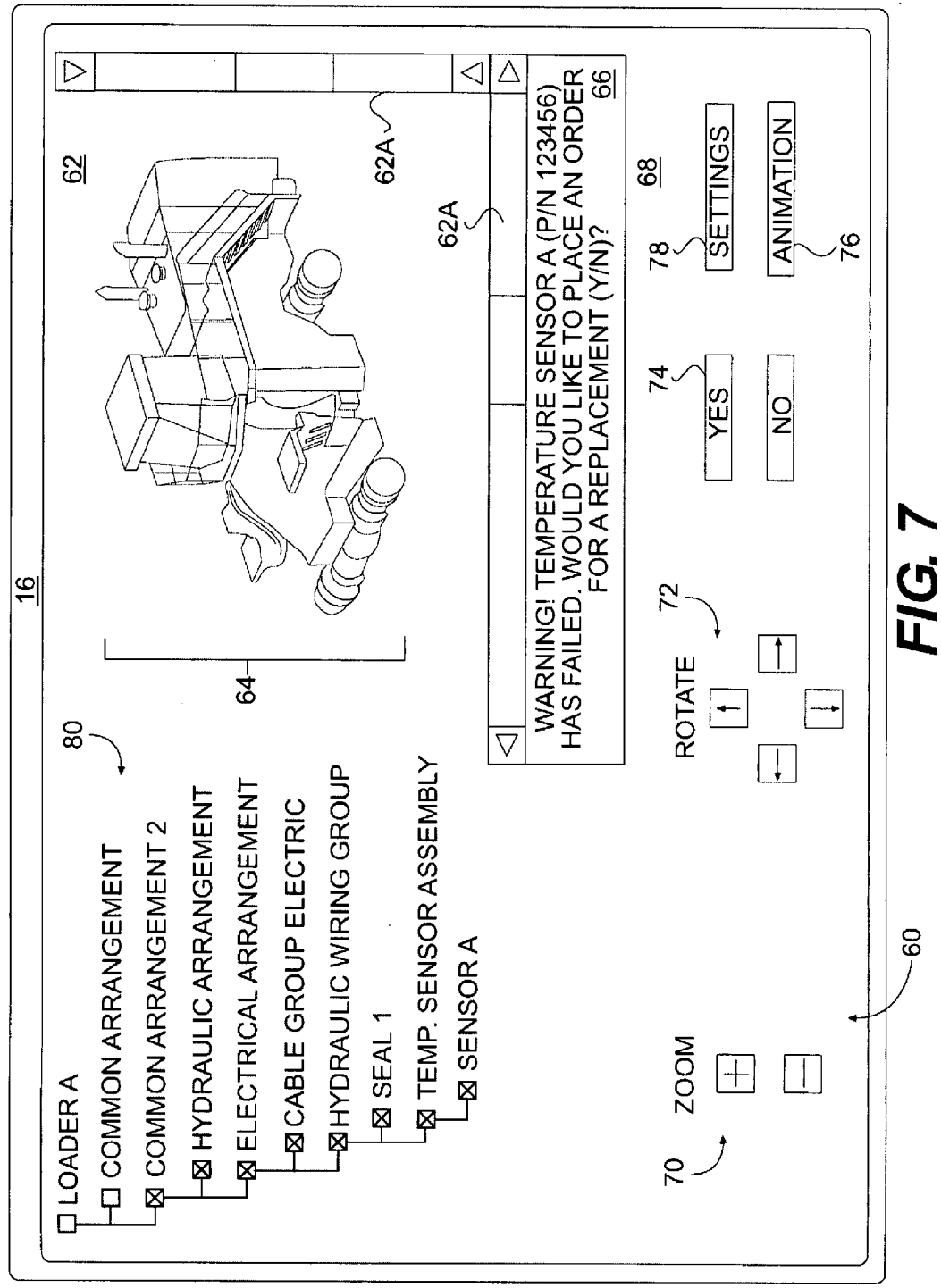
Figure 8:
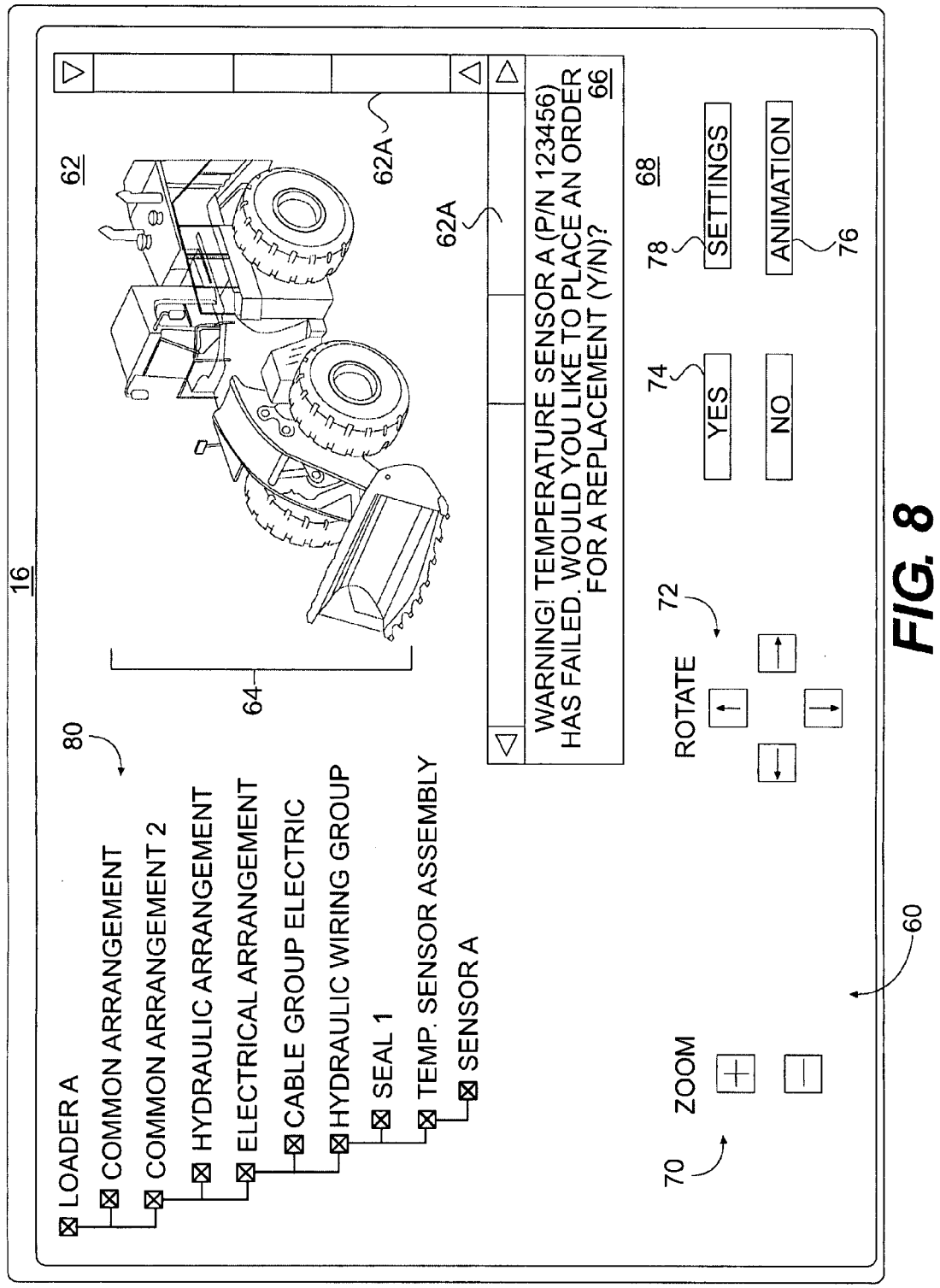

FIGS. 4-8 show examples in which the user has selected boxes 80a corresponding to different assembly/sub-assembly levels in parts list 80. For example, FIG. 4 shows an example in which the user has subsequently selected an entry 80a corresponding to the Temperature Sensor Assembly. Upon such a selection, controller 24 may show a three dimensional model of the entire temperature assembly in display area 62. FIG. 5 shows an example in which the user has subsequently selected an entry 80a corresponding to the Hydraulic Wiring Group. As such, controller 24 may show a three-dimensional model of the entire Hydraulic Wiring Group in display area 62 in response to the selection. FIG. 6 shows an example in which the user has subsequently selected entry 80a corresponding to the Electrical Arrangement. In response, controller 24 may show a three-dimensional model of the entire Electrical Arrangement in display area 62. FIG. 7 shows an example in which the user has subsequently selected an entry 80a corresponding to the Common Arrangement 2. As such, controller 24 may show a three-dimensional model of the entire Common Arrangement in display area 62 in response to the selection. Similarly, FIG. 8 shows an example in which the user has subsequently selected an entry 80a corresponding to the entire machine 10. In response to the selection, controller 24 may show a three-dimensional model of the entire machine 10 in display area 62.

Based on the data retrieved from diagnostic information 52c, controller 24 may prompt the user, via GUI 60, as to whether a replacement for failed component 64a should be ordered. In one embodiment, the prompting may further include recommending that one or more accessory items related to the replacement of failed component 64a also be ordered (e.g., glue, seals, bolts, tools, etc.). Upon selecting "Yes" button 74 or otherwise affirming the order, controller 24 may automatically access machine component information 52d to determine if the at least one failed component 64a is of a latest version thereof. For example, controller 24 may compare a parts list contained in controller 24 with a latest parts list of the particular machine contained in machine component information 52d to determine the latest version of the at least one failed component.

Controller 24 may then access dealer information 52e to identify a best dealer that can provide the latest version of the replacement for failed component 64a based on settings contained customer subscription information 52a. For example, if the customer of machine 10 prefers on-site delivery, controller 24 may generate a dealer list by identifying one or more dealers than can supply the part and that offer on-site delivery based on the data contained in dealer information 52e. Controller 24 may then filter or sort the dealer list based on a location of machine 10. For example, controller 24 may determine a global position of machine 10 based on the signals provided by locating device 20, compare the global position to the location of each dealer in the list, and sort the list based on a distance therebetween (e.g., a distance comparison based on zip codes and/or addresses). Controller 24 may then select a best dealer from the list based on inventory information about failed component 64a (e.g., in-stock, back order, price, etc.) as to minimize cost and delivery time. Controller 24 may then prompt the user via GUI 60 as to whether the order for a replacement component(s) and/or accessories should be finalized with the best dealer. This may include displaying information about the potential order, such as, for example, a price, an estimated delivery time, and/or a dealer name and location. In one aspect, determining a price may include accessing customer subscription information 52a and component information 52d to determine if the particular components are covered by a warranty. The price may also include delivery charges or any other charges associated with the transaction.

If the user affirms the order via input to GUI 60, controller 24 may communicate the order for the at least one replacement component from the best dealer to off-board system 22. The order may be stored in storage 54 and later retrieved by the particular dealer for processing. Alternatively or additionally, the order may be communicated directly to the dealer, if in communication with machine 10, or relayed by off-board system 22 to the dealer. Additionally, controller 24 may affect a sale to the customer by, for example, charging an account associated with the particular customer contained in customer subscription information 52a (e.g., credit card account). Controller 24 may similarly process an order for the replacement component, if customer subscription information 52a indicates the customer prefers delivery of the component to a shipping or mailing address, in-store pickup, or another preference. In another aspect, controller 24 may present, via GUI 60, for the user's selection, more than one dealer that can provide the replacement component(s), and the user may select a desired dealer to process the order.

In another aspect, controller 24 may prompt the user via GUI 60 as to whether an appointment should be made at the selected dealer location to install the ordered replacement part(s). If the user selects "Yes" button 74 or otherwise responds with affirmative input to GUI 60, controller 24 may access the scheduling information for the selected dealer contained in dealer information 52e. Controller 24 may then display, via GUI 60, the maintenance calendar for the selected dealer. In particular, controller 24 may display the maintenance calendar such that the period of time shown overlaps with the time at which the ordered replacement part is expected to be delivered. Controller 24 may visually indicate on the calendar the dealer's available appointment times during which the user may schedule the installation of the ordered replacement part. The user may select a desired appointment time via input to GUI 60.

One skilled in the art will realize that the processes illustrated in this description may be implemented in a variety of ways and include other modules, programs, applications, scripts, processes, threads, or code sections that may all functionally interrelate with each other to accomplish the individual tasks described above for each module, script, and daemon. For example, these programs modules may be implemented using commercially available software tools, using custom object-oriented code written in the C++ programming language, using applets written in the Java programming language, or may be implemented with discrete electrical components or as one or more hardwired application specific integrated circuits (ASIC) that are custom designed for this purpose.

The described implementation may include a particular network configuration but embodiments of the present disclosure may be implemented in a variety of data communication network environments using software, hardware, or a combination of hardware and software to provide the processing functions.

INDUSTRIAL APPLICABILITY

The disclosed and system and subscription service may provide ways to visually identify, find, and automatically order a replacement for a failed part of a machine. In particular, the disclosed system and service may allow a user to intuitively identify a failed part and determine its location within the systems and subsystems of the machine by way of three-dimensional models provided to an associated GUI. Further, the disclosed system and service may automatically prompt the user to place an order for a replacement part. In this manner, machine downtime may be reduced. Usage of the disclosed visual diagnostic system and subscription service will now be explained.

During operation of machine 10, controller 24 may receive signal(s) from sensors 14a-e indicative of a status of one or more components thereof. For example, a signal provided by a temperature sensor 14a associated with engine 28 may begin deteriorate, lose integrity, or otherwise malfunction. In response to the signal from sensor 14a, controller 24 may identify and retrieve a fault code in the fault code table, and initiate the disclosed visual diagnostic subscription service.

As a first step of the visual diagnostic subscription service, controller 24 may request access to off-board system 22. Off-board system 22 may, in response, determine if machine 10 has a valid subscription, as discussed above. Upon a determination that machine has a valid subscription, controller 24 may receive access to off-board system 22. Controller 24 may then access diagnostic information 52c, look up an entry for the identified fault code of the particular machine, and retrieve any information associated with the entry. The information may indicate, for example, that Temperature Sensor A has failed, and its part number is "123456". The information may also indicate, for example, that Temperature Sensor A falls within the Hydraulic Wiring Group, of the Electrical Arrangement, of the Common Arrangement 2, of Wheel Loader A. Still further, the information may indicate certain recommended accessories that should be ordered along with a replacement temperature sensor (e.g., a mounting hardware pack and an electrical connector). This information may be returned to controller 24 for processing.

Subsequently, controller 24 may access and search media library 52b for media assets indexed to or otherwise associated with Temperature Sensor A based on the machine's serial number and/or the part number for Temperature Sensor A. In another embodiment, controller 24 may search media library 52b for all media assets associated with machine 10 based on the machine's serial number. Controller 24 may then download and store in memory the appropriate media assets. In another aspect, controller 24 may similarly retrieve the media assets stored in computer readable storage already onboard machine 10.

Referring to FIG. 3, controller 24 may then display GUI 60 by way of user interface 16, as described above. Specifically, controller 24 may display in area 62 a three-dimensional model of the failed temperature sensor 64a in its assembled environment, based on the accessed media assets. Controller 24 may also generate an appropriate selectable parts list 80 based on the machine parts list stored in controller 24 and/or retrieved from component information 52d. As shown in FIG. 3, selectable parts list 80 may be displayed as an expanding/collapsing outline indicating where the failed temperature sensor 64a falls within the assemblies and subassemblies of machine 10. As shown in FIG. 3, controller 24 may highlight or otherwise visually indicate the entries of parts list 80 corresponding to the assemblies and subassemblies in which the failed temperature sensor 64a is included (e.g., Wheel Loader A>Common Arrangement 2>Electrical Arrangement>Hydraulic Wiring Group>Temperature Sensor Assembly>Temperature Sensor A).

Controller 24 may also display, in information prompt area 66, a message indicating that the temperature sensor has failed and asking the user if a replacement part should be ordered. For example, controller 24 may display "Warning! Temperature Sensor A (P/N 123456) has failed. Would you like to place an order for a replacement part (Y/N)?" In one aspect, the user may wish to first explore the nature of the failure before deciding whether a replacement component should be ordered. For example, the user may customize a desired view of failed temperature sensor 64a by zooming in/out and rotating the view using buttons 70 and 72, respectively. The user may also view an animation of the assembly/disassembly required to access and replace failed temperature sensor 64a by pressing button 76.

Additionally, the user may wish to visually identify the assemblies and sub-assemblies in which failed temperature sensor 64a is included using selectable parts list 80. For example, the user may click on a box 80a corresponding to the Temperature Assembly to visually explore a three-dimensional model thereof (FIG. 4). As discussed above, the user may similarly explore the Hydraulic Wiring Group (FIG. 5), the Electrical arrangement (FIG. 6), Common Arrangement 2 (FIG. 7), and/or machine 10 (FIG. 8). It is to be appreciated, however, that the user may select any combination of boxes 80a to generate a desired model 64 containing any number and combination of components, sub-assemblies, assemblies, etc., of machine 10.

Upon being satisfied that a replacement for failed temperature sensor 64a should be ordered, the user may select "Yes" button 74 or otherwise affirm an order via input to GUI 60. In response, controller 24 may access machine component information 52d and/or dealer information 52e to identify a best dealer that can provide a replacement part for failed temperature sensor 64a based on the preferences in customer subscription information 52a, as discussed above. Alternatively, controller 24 may provide multiple dealers for the user's selection, as discussed above Controller 24 may then prompt the user via GUI 60 as to whether the recommended accessories should also be ordered along with a replacement for failed temperature sensor 64a. For example, controller 24 may display in prompt area 66: "Would you also like to order the following recommended accessories: mounting hardware pack (P/N 123455, $1.99), an electrical connector (P/N 123458, $5.99)?" The user may then select or deselect the accessories and affirm the order via appropriate input to GUI 60. Once affirmed, controller 24 may affect a sale to the customer, as discussed above.

Controller 24 may then prompt the user via GUI 60 as to whether a maintenance appointment should be scheduled with the selected dealer. For example, controller 24 may display in prompt area 66: "Would you like to schedule a repair appointment with dealer XYZ (Y/N)?" If the user affirms, controller 24 may display an appointment calendar for the selected dealer, and the user may select and schedule an available appointment, as discussed above.

By employing the visual diagnostic system, a subscribing user may be able to quickly identify and order a replacement for a failed component on a machine, thereby reducing downtime. Further, the user may be able to visually identify the assemblies and subassemblies in which the failed component is included, which may aid in self-service replacement of the component. Additionally, the user may be able to schedule an appointment to have the component serviced, if desired.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A visual diagnostic system for providing a diagnostic service for a machine, comprising:
   a sensor located onboard the machine and configured to generate a signal indicative a status of a machine component;
   a display device associated with the machine; and
   a controller in communication with the sensor and the display device, wherein the controller is configured to:
   responsive to the status signal, determine whether a customer associated with the machine has a subscription under the diagnostic service to access computer-aided design (CAD) models of components of the machine;

when it is determined the customer has a subscription, access at least one CAD model associated with the component and stored in a component model database;

render a view of at least the component based on the accessed at least one model; and display on the display device the rendered view of at least the component.

2. The visual diagnostic system of claim 1, further comprising a user input device configured to receive input from a user of the visual diagnostic system, wherein the controller is further configured to:

display on the display device a user interface allowing selection of a plurality of different hierarchical component levels of the machine that include the component;

receive, by way of the user input device, a selection by the user of a desired component level of the machine;

identify components of the machine included within the selected level;

render a view of the identified components based on the accessed at least one model; and display, on the display device, the rendered view of the identified components.

3. The visual diagnostic system of claim 1, wherein the status includes a failure of the component.

4. The visual diagnostic system of claim 3, further comprising a user input device configured to receive input from a user of the visual diagnostic system, wherein the controller is further configured to:

display a warning on the display device indicating that the component has failed, based on the status;

prompt, by way of the display device, the user to order a replacement for the component; and receive, by way of the user input device, user input indicating that the replacement be ordered.

5. The visual diagnostic system of claim 4, further including an off-board system in communication with the controller, wherein the controller is further configured to:

identify a dealer local to the machine that can supply the replacement; and communicate to the off-board system an order for the replacement from the local dealer.

6. The visual diagnostic system of claim 4, wherein the controller is further configured to:

prompt, by way of the display device, the user to order a recommended accessory associated with the replacement; and receive, by way of the user input device, input indicating that the recommended accessory be ordered.

7. The visual diagnostic system of claim 1, wherein the accessed at least one model comprises an encrypted JT CAD data format file containing information about the machine.

8. The visual diagnostic system of claim 1, wherein the accessed at least one model is stripped of at least dimensional information of the component.

9. A computer-implemented method for providing a visual diagnostic service for a machine, the method comprising:

receiving an indication of a status of a component of the machine;

responsive to the status indication, determining whether a customer associated with the machine has a subscription under the diagnostic service to access CAD models associated with components of the machine;

when it is determined that the customer has a subscription to the diagnostic service, receiving access to at least one CAD model associated with the component and stored in a model database;

rendering a view of at least the component based on the accessed at least one model; and displaying the view of at least the component on a display device.

10. The method of claim 9, further comprising:

displaying, on the display device, a user interface allowing selection of different hierarchical component levels of the machine that include the component;

receiving input from a user of the visual diagnostic service selecting of a desired hierarchical component level of the machine;

identifying components of the machine included within the selected hierarchical component level;

rendering a view of the identified components based on the accessed at least one model; and displaying, on the display device, the rendered view of the identified components.

11. The method of claim 9, wherein the status indicates a failure of the component.

12. The method of claim 11, further comprising:

displaying a warning on the display device indicating that the component has failed;

prompting the user to order a replacement for the component; and receiving input from the user indicating that the replacement be ordered.

13. The method of claim 12, further comprising:

identifying a dealer local to the machine that can supply the replacement; and communicating an order for the replacement from the local dealer.

14. The method of claim 9, wherein the accessed at least one model comprises an encrypted JT CAD data format file containing information about the component.

15. The method of claim 9, wherein the accessed at least one model is stripped of at least dimensional information of the component.

* * * * *